(12) United States Patent
Hall et al.

(10) Patent No.: US 8,953,479 B2
(45) Date of Patent: Feb. 10, 2015

(54) SYSTEM AND METHOD FOR LICENSE ENFORCEMENT FOR DATA CENTER MONITORING APPLICATIONS

(75) Inventors: James Gregory Hall, Kittery, ME (US); Kevin Eugene Davis, San Antonio, TX (US); Jason Joseph Spofford, Austin, TX (US); Will Caseino Lauer, Champaign, IL (US)

(73) Assignee: CA, Inc., Islandia, NY (US)

( * ) Notice: Subject to any disclaimer, the term of this patent is extended or adjusted under 35 U.S.C. 154(b) by 378 days.

(21) Appl. No.: 13/569,023

(22) Filed: Aug. 7, 2012

(65) Prior Publication Data

US 2014/0043985 A1 Feb. 13, 2014

(51) Int. Cl.
*H04L 12/26* (2006.01)
(52) U.S. Cl.
USPC .......................................... 370/252; 370/400
(58) Field of Classification Search
CPC ............ G06F 21/10; G06F 2221/2109; G06F 21/105; G06F 21/606; H04N 21/6125; H04N 21/8355
See application file for complete search history.

(56) References Cited

U.S. PATENT DOCUMENTS

| | | | |
|---|---|---|---|
| 7,894,355 B2* | 2/2011 | Bennett | 370/252 |
| 2008/0028216 A1* | 1/2008 | Kyojima et al. | 713/168 |
| 2008/0028471 A1* | 1/2008 | Chen et al. | 726/27 |
| 2011/0205909 A1* | 8/2011 | Cao et al. | 370/248 |

\* cited by examiner

*Primary Examiner* — Jung Park
(74) *Attorney, Agent, or Firm* — Baker Botts L.L.P.

(57) ABSTRACT

Methods include receiving a threshold time to live ("TTL") value associated with a license. The methods include determining a first TTL value based on the threshold TTL value. The methods include transmitting a polling request including the first TTL value from a polling device disposed at the network location to a network device. The first TTL value decreases each time the polling request transits through a node device. The methods include receiving a polling response from the network device if the first TTL value has not decreased to a predetermined value before the polling request is received by the network device. The methods include determining that the license permits communication between a monitoring device disposed at the network location and the network device in response to receiving the polling response.

18 Claims, 6 Drawing Sheets

SYSTEM AND METHOD FOR LICENSE ENFORCEMENT FOR DATA CENTER MONITORING APPLICATIONS

BACKGROUND

The present disclosure relates to service assurance in cloud computing and, more specifically, to a system and method for license enforcement for data center monitoring applications.

Enterprise information technology ("IT") management solutions which access internet protocol ("IP") addressable infrastructure typically have licenses which restrict one or more of the number of managed items and the address range/list or name, in addition to one or more of node locking, time limits, and requirements for keys to unlock features.

When packets of data are transferred between devices in an IP network, a time to live ("TTL") value is embedded in the TTL (i.e., IPv4) or Hop Limit (i.e., IPv6) field of the IP header of each packet of data. The TTL/Hop Limit field is an 8 bit binary counter value located in the IP header of all IPv4 and IPv6 packets respectively. The TTL value is initialized by the sender of the IP packet to a specific value between 1 and 255, and is reduced, according to IPv4 standards, by the amount of time it takes the device to process the IP Packet. In modern networks, this amount of time is almost always much less than 1 second. Thus, by convention for IPv4 and by standard for IPv6, such IP Layer 3 ("IP L3") devices reduce the TTL field by 1 increment each time they process an IP packet. When the TTL counter field value has been reduced to zero, the IP packet with its data is discarded by the handling device (i.e., IP L3 router) and an ICMP message of "Time Exceeded" is sent to the sending device by the discarding device (i.e., the IP L3 router) informing it that the associated packet has been discarded. The TTL value is utilized in this manner to prevent data packets from circulating indefinitely in a network. Typical values that modern operating systems (e.g., Windows or Linux) use to initialize the TTL/Hop Limit field are in the range of 64 to 128. Thus, IP packets with an initial value of "64" can travel up to 64 IP L3 hops in a network before they are discarded (i.e., when the field reaches "0").

BRIEF SUMMARY

According to an aspect of the present disclosure, a method may comprise determining whether a license permits communication between a monitoring device disposed at a particular network location and a network device. In particular, the method may comprise receiving a threshold time to live ("TTL") value associated with the license. The method may comprise determining an first TTL value based on the threshold TTL value. The method may comprise transmitting a polling request comprising the first TTL value from a polling device disposed at the particular network location to the network device. The first TTL value may decrease each time the polling request transits through a node device. The method may comprise receiving a polling response from the network device if the first TTL value has not decreased to a predetermined value before the polling request is received by the network device. The method may comprise determining that the license permits communication between the monitoring device and the network device in response to receiving the polling response.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to service assurance in cloud computing, systems and methods disclosed herein may be related to IT service and asset management in cloud computing, as well as in other areas related to cloud computing. Systems and methods disclosed herein may be applicable to a broad range of applications that monitor various parameters associated with various disciplines, such as, for example, industrial activities (e.g., power generation, manufacturing, refining, transportation, construction), commercial activities (e.g., sales, advertising, financial evaluation and modeling, inventory control), IT systems (e.g., performance monitoring, environmental monitoring, utilization monitoring, stress-testing, access control, provisioning services, bandwidth monitoring, packet-routing), and other activities of importance to the user.

With the emergence of the cloud market, there may be a business case for limiting management systems and methods to data center infrastructure itself, but not allowing management of resources outside the cloud without additional licensing permissions. Managed service provider ("MSP") and software as a service ("SaaS") services, for example, may license per customer. It may be challenging to devise a license and enforcement which may be practical from a back-office overhead standpoint, especially in scenarios in which indirect sales channels may be involved.

In systems and methods disclosed herein, a monitor point (e.g., a poller or polling device that may communicate with managed elements inside a datacenter) may be within the datacenter. An IP Layer 3 "radius" may be defined by a number of router hops between the monitor point and an outermost element in the data center with respect to the poller. The poller may use a TTL/Hop Limit control in an IP header, for example, to define a TTL value that may limit management protocols to devices within the defined radius. At some point, the hop count may be high enough such that devices requiring, more hops may be located outside the data center. Depending on how critical it is to exclude all outside elements, pre-sales activities may be assessed to determine the radius and to request a license key with a customized radius, or the license key may be set to a standard, default radius, which covers most data centers with some leniency. Therefore, the license key may require only a single scalar (e.g., a TTL value) to set the radius. Accordingly, systems and methods disclosed herein may offer a novel and practical solution for lenient enforcement of licenses intended to restrict the radius of a monitoring solution.

Figure 1:
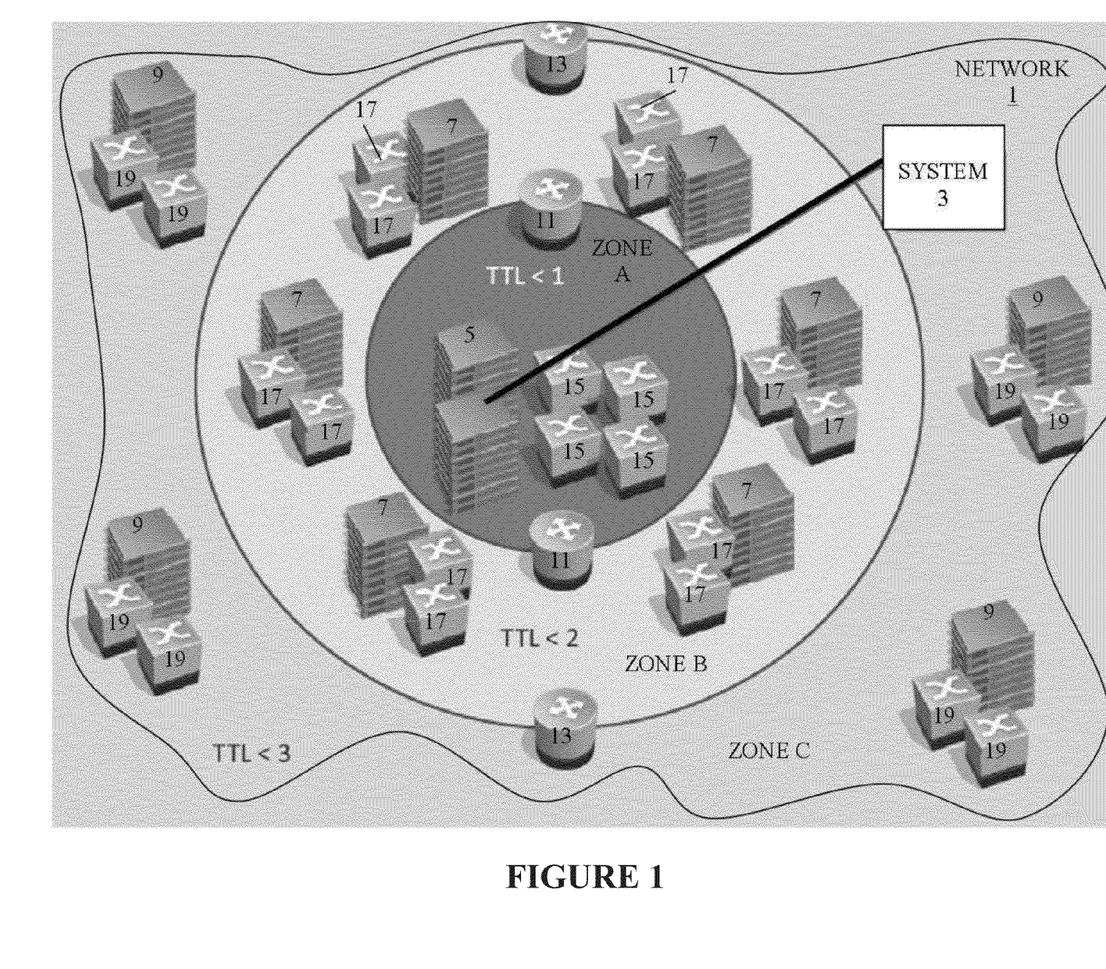
FIG. 1 is a schematic representation of a network 1 for transmitting and receiving information and for provisioning and receiving services, the network comprising network devices disposed at various network locations.

Referring now to FIG. 1, a network 1 for transmitting and receiving information and for provisioning and receiving services now is described. Network 1 may comprise one or more clouds, which may be public clouds, private clouds, or community clouds. Each cloud may permit the exchange of information and services among users that are connected to such clouds. In certain configurations, network 1 may be a wide area network, such as the Internet. In some configurations, network 1 may be a local area network, such as an intranet. Further, network 1 may be a closed, private network in certain configurations, and network 1 may be an open network in other configurations. Network 1 may facilitate wired or wireless communications of information and provisioning of services among users that are connected to network 1.

Network 1 may comprise a system 3; one or more servers 5, 7, and 9; one or more node devices 11 and 13; and one or more devices 15, 17, and 19. System 3; servers 5, 7, and 9; node devices 11 and 13; and devices 15, 17, and 19 may be referred to as network devices. Each of servers 5, 7, and 9 and devices 15, 17, and 19 may execute a particular configuration of one or more of software, firmware, and other computer-executable code, which may be stored therein or may be accessible thereby. Servers 5, 7, and 9 may provide a plurality of services to and exchange information with other servers 5, 7, 9; devices 15, and 19; and other devices and servers connected thereto. Devices 15, 17, and 19 may utilize services provided by servers 5, 7, and 9 and may exchange information with other devices 15, 17, and 19; servers 5, 7, and 9; and other devices and servers connected thereto. The services may comprise, for example, information technology services, financial services, business services, access services, monitoring services, operations services, infrastructure services, and other resource-provisioning services. Servers 5, 7, and 9 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 15, 17, and 19 may comprise, for example, one or more of general purpose computing devices, specialized computing devices, mobile devices, wired devices, wireless devices, passive devices, mainframe devices, monitoring devices, infrastructure devices, and other devices utilized by service consumers and information consumers. The structure of servers 5, 7, and 9 and devices 15, 17, and 19 (e.g., the network devices may be substantially similar to the structure of polling device 104 (e.g., network devices may comprise one or more of a memory, a CPU, and I/O device, and the CPU may operate as one or more of a receiving device, a determining device, and a transmitting device) (described below), and further description of such structure is omitted herein.

Node devices 11 and 13 may link (e.g., provide a path for data packets to hop between) servers 5, 7, and 9; devices 15, 17, and 19; system 3; and other devices or servers together, such that information and services may be exchanged therebetween. For example, node device 11 may link devices 17 and servers 7 with devices 15, servers 5, and system 3, such that data packets sent from one or more of devices 15, servers 5, and system 3 must transit a node device 11 before arriving at one or more of devices 17 and servers 7. Further, node devices 11 and 13 together may link devices 19 and servers 9 with devices 15, servers 5, and system 3, such that data packets sent from one or more of devices 15, servers 5, and system 3 must transit each of a node device 11 and a node device 13 before arriving at one or more of devices 19 and servers 9. Node devices 11 and 13 may comprise, for example, one or more of routers and other devices (e.g., IP L3 devices), which are not end host devices, and which are configured to connect network devices together for one or more of wired and wireless communication.

Node devices 11 and 13 may act as boundaries between different zones of servers, devices, and other equipment. For example, zone A may be defined as a zone comprising system 3. Zone A also may comprise servers 5 and devices 15 because servers 5 and devices 15 may communicate with system 3 without transmitting data through node devices 11 and 13 (e.g., direct communication or communication through a local node device, such as a switch, which may not be defined as a boundary node device). Further, zone 13 may comprise servers 7 and devices 17 and may be defined such that servers 7 and devices 17 may communicate with system 3 only by transmitting data through a node device 11. Moreover, zone C may comprise servers 9 and devices 19 and may be defined such that servers 9 and devices 19 may communicate with system 3 only by transmitting data through a node device 13 and a node device 11. Accordingly, each zone may be defined by the number of hops (e.g., node device transits) from system 3 required to reach the zone. Alternatively or additionally, because each node device 11 and 13 may decrease a TTL value associated with a data packet each time the data packet hops (e.g., transits) through the each node device 11 and 13, the zones may be defined by a minimum TTL value required to travel from system 3 (e.g., the minimum TTL value required to reach system 3 from zone A is greater than 1, the minimum TTL value required to reach system 3 from zone B is greater than 2, and the minimum TTL value required to reach system 3 from zone C is greater than 3).

System 3 may perform a polling process (described below) to detect one or more of servers 5, 7, and 9; devices 15, 17, and 19; and other devices connected to network 1. In particular configurations, system 3 may be configured similarly to one or more of servers 5, 7, 9 and devices 15, 17, and 19. Moreover, system 3 may perform a monitoring process, in which system 3 may monitor and collect information from and about one or more of servers 5, 7, and 9; devices 15, 17, and 19; and other devices connected to network 1, based upon predetermined licensing conditions (described below). System 3 may execute such polling, monitoring, and data-collection processes in accordance with computer-readable instructions (e.g., software, firmware, an application, a computer program) stored therein or accessible thereby.

System 3 may be, for example, one or more of a general purpose computing device, a specialized computing device, a wired device, a wireless device, a mainframe device, an infrastructure device, a monitoring device, and any other device configured to perform one or more of a polling process, a monitoring process, and a data-collection process, in which system 3 may collect data from one or more data sources (e.g., servers, sensors, networks, other devices). System 3 may connect to network 1 and monitor one or more of servers 5, 7, and 9; devices 15, 17, and 19; and other devices connected network 1 for available information from or about servers 5, 7, and 9; devices 15, 17, and 19; and other devices connected to network 1 and available information (e.g., performance information, access information, user information, physical conditions, error information, location and geography, ambient conditions, efficiency, associated costs, utilization, availability, other variable information) about the services and information provided and received through network 1. By monitoring the one or more of servers 5, 7, and 9; devices 15, 17, and 19; and other devices connected to network 1 and collecting data associated with servers 5, 7, and 9; devices 15, 17, and 19; and other devices connected to network 1, system 3 may generate rich datasets regarding operational parameters and conditions for servers 5, 7, and 9; devices 15, 17, and 19; and other devices connected to network 1, and other systems, events, services, and processes monitored by such devices. In this manner, system 3 may detect changes in or determine current performance parameters of servers 5, 7, and 9; devices 15, 17, and 19; and other devices connected to network 1, and other systems, events, services, and processes monitored by such devices. In some configurations, one or more of a server 5, 7, and 9 and a device 15, 17, and 19 may perform one or more functions of system 3, and system 3 or portions thereof may be omitted. In other configurations, system 3 may be separate from servers 5, 7, and 9 and devices 15, 17, and 19.

In alternative configurations, system 3 may perform the polling process but may not monitor and collect information; however, one or more of servers 5, devices 15, and other devices in zone A may monitor and collect information from and about one or more of servers 5, 7, and 9; devices 15, 17, and 19; and other devices connected to network 1, in accordance with results of the polling process. Consequently, in such alternative configurations, the one or more of servers 5, devices 15, and the other devices in zone A may execute such monitoring and data-collection processes in accordance with computer-readable instructions (e.g., software, firmware, an application, a computer program) stored therein or accessible thereby similar to those disclosed above, with reference to system 3.

System 3 may perform monitoring processes and data collection processes in accordance with computer-readable instructions, such as, for example, one or more of software, firmware, applications, and other forms of computer-readable instructions. Performance of one or more of the monitoring process and the data collection process may be restricted by a license provided to the user of system 3. The license may restrict one or more of monitoring and data collection to network devices within a predetermined range (e.g., an IP Layer 3 radius) based on the location of system 3 (e.g., within a data center comprising system 3). Consequently, the license may define the range based on a particular number of hops among node devices (a number of hops that would be required for a data packet to hop to a node device outside the data center). In some configurations, the range may be a standard default radius provided to all users that generally limits the restricted process to a data center, but which may provide leniency at the boundaries of the data center, such that some network devices that are near but outside the boundaries of the data center may be monitored. In certain configurations, the range may be customized for a particular user as part of the pre-sale licensing process, such that each particular user may request a customized range based on the particular user's requirements. In particular configurations, the range may be a function of cost, such that users may pay a higher license fee to have a greater range. Moreover, in still other configurations, the license may restrict particular processes or particular functionality of processes in a different manner at different ranges an unlimited number of network devices located within two hops of system 3 may be monitored, only 10 network devices located from two to five hops from system 3 may be monitored, and no devices located further than five hops from system 3 may be monitored). Each of the above-described licensing restrictions may be implemented by associating a threshold TTL value with the license (described below). Accordingly, the license may allow system 3 to monitor and collect data related to an unrestricted number of network devices within a data center, but may prevent the user from abusing the license by monitoring and collecting data related to network devices outside of the data center.

Figure 2:
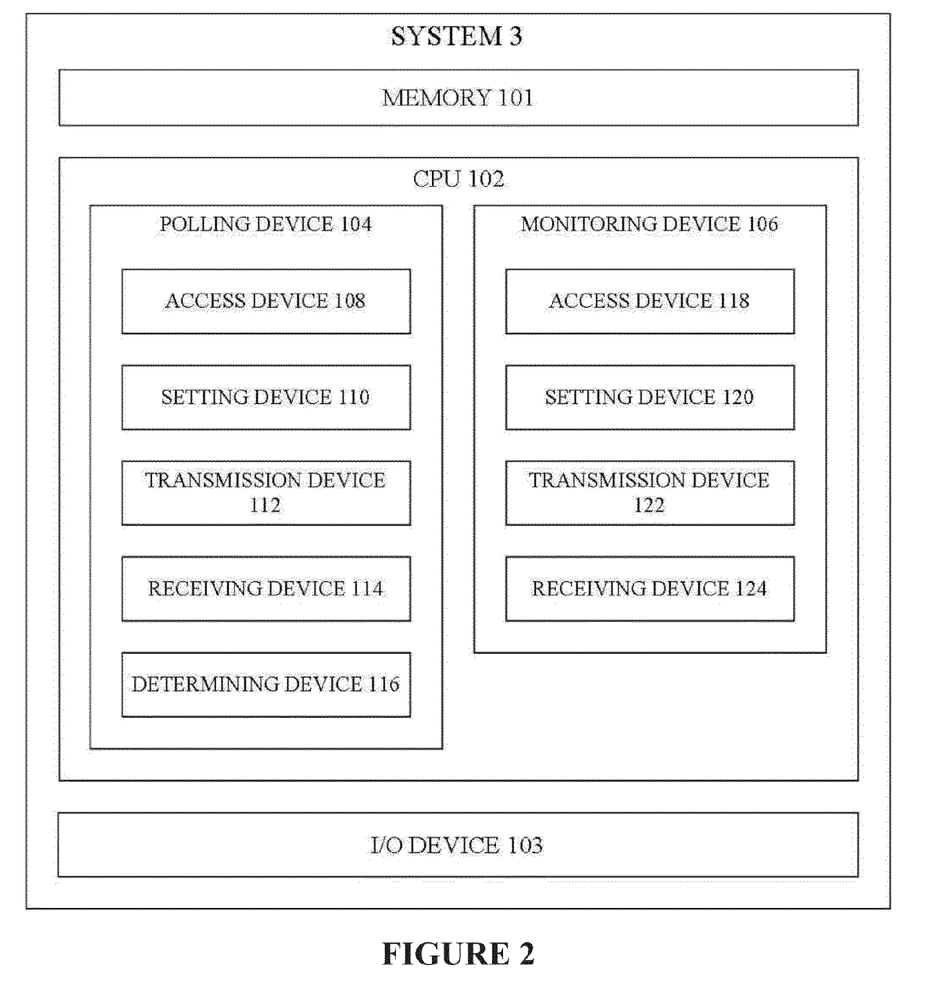
FIG. 2 is a schematic representation of a system configured to perform a polling process, a monitoring process, and a data collection process.

Referring now to FIG. 2, system 3, which that may perform a license enforcement process comprising a polling process and one or more of a monitoring process, in which system 3 may monitor and collect data from one or more of servers 5, 7, and 9; devices 15, 17, and 19; other devices connected to network 1, and other devices connected with or incorporated into system 3, and a data collection process now is described. System 3 may comprise a memory 101, a central processing unit ("CPU") 102, and an input and output ("I/O") device 103. Memory 101 may store computer-readable instructions that may instruct system 3 to perform certain processes. In particular, when executed by CPU 102, the computer-readable instructions stored in memory 101 may instruct CPU 102 to operate as one or more of a polling device 104 and a monitoring device 106. In alternative or additional configurations, one or more of polling device 104 and monitoring device 106 may be implemented on one or more different CPUs, which may be comprised in remote or local devices. More specifically, when CPU 102 operates as polling device 104, the computer-readable instructions may instruct CPU 102 to operate as one or more of an access device 108, a setting device 110, a transmission device 112, and a determining device 116. In some configurations, polling device 104 may not comprise determining device 116, and CPU 102 or another CPU, local or remote, may operate as determining device 116. Further, when CPU 102 operates as monitoring device 106, the computer-readable instructions may instruct CPU 102 to operate as one or more of an access device 118, a setting device 120, a transmission device 122, and a receiving device 124. I/O device 103 may receive one or more of data from network 1, data from other devices connected to system 3, and input from a user, and I/O device 103 may provide such information to CPU 102. I/O device 103 may transmit data to network 1, may transmit data to other devices connected to system 3, and may transmit a notification to a user (e.g., display a message, make a sound, send an email, make a telephone call). Further, I/O device 103 may implement one or more of wireless and wired communication between system 3 and other devices.

Figure 3:
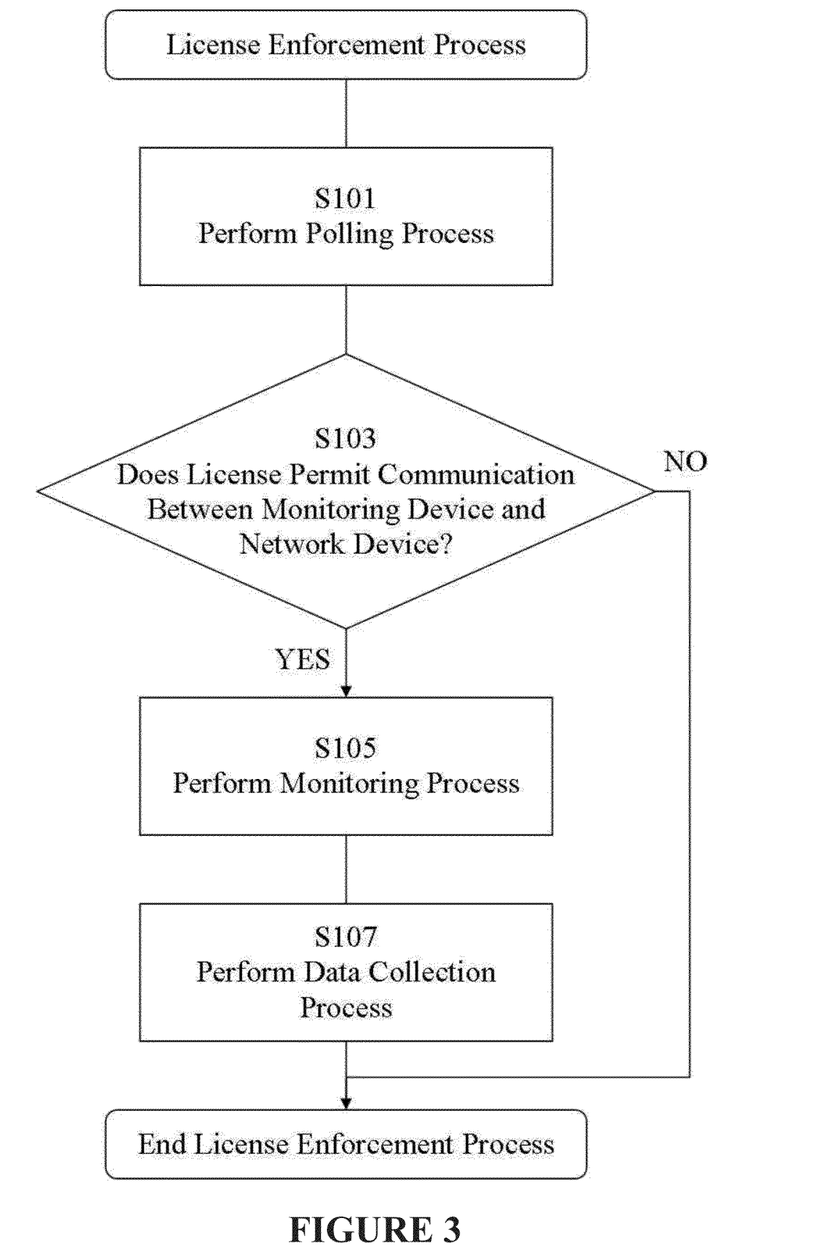
FIG. 3 illustrates a license enforcement process for a monitoring process and a data collection process.

Referring now to FIG. 3, a license enforcement process for a monitoring process and a data collection process now is described. In S101, polling device 104 may perform a polling process (described below), in which polling device 104 determines whether a license associated with one or more of a monitoring process and a data collection process permits communication between monitoring device 106 and one or more network device (e.g., one or more of servers 5, 7, and 9; devices 15, 17, and 19; and node devices 11 and 13) in the current network configuration (e.g., monitoring device 106 is disposed at a particular network location and the network device is disposed at another network location). The determination made during the polling process may be based on the relative network positions of polling device 104 and the one or more network device in network 1 and may be based on a threshold TTL value defined in the license associated with the one or more of the monitoring process and the data collection process.

In S103, CPU 102 may determine whether one or more of the monitoring process and the data collection process may be performed based on the determination made by polling device 104 in the polling process of S101. If polling device 104 determines that the license associated with the one or more of the monitoring process and the data collection process permits communication between monitoring device 106 disposed at the particular network location (e.g., zone A) and the network device disposed at another network location (e.g., one of zones A, B, and C) (S103: YES), the process may proceed to S105. If polling device 104 determines that the license associated with the one or more of the monitoring process and the data collection process does not permit communication between monitoring device 106 disposed at the particular network location and the network device disposed at another network location (S103: NO), the license enforcement process may end and system 3 may not perform the one or more of the monitoring process and the data collection process. In some configurations, determining device 116 may perform the determining process performed in S103.

In S105, monitoring device 106 may perform a monitoring process (described below), in which monitoring device 106 requests information, about particular metrics associated with one or more of network 1 and the one or more network device, from the one or more network device and receives one or more responses from the one or more network device comprising the requested information. Further, monitoring device 106 is configured to end the monitoring process in response to the one or more network device being moved outside of the range permitted by the license. S107 may be performed after S105 ends or concurrently with S105.

In S107, CPU 102 may perform a data collection process, in which CPU 102 stores, in memory 101 or in other internal, remote, or removable memory, the information comprised in the responses received from the one or more network device by monitoring device 106 during the monitoring process. Consequently, the information stored in memory 101 may be analyzed to gain insight into, for example, one or more of the performance and utilization of network 1 and the one or more network device. After performing the data collection process, CPU 102 may end the license enforcement process.

In particular configurations, the polling process, the monitoring process, and the data collection process may be performed by CPU 102. In certain configurations, one or more of the polling process, the monitoring process, and the data collection process may be performed by different CPUs or even different systems. In other configurations, one or more of the monitoring process and the data collection process may be omitted.

Figure 4:
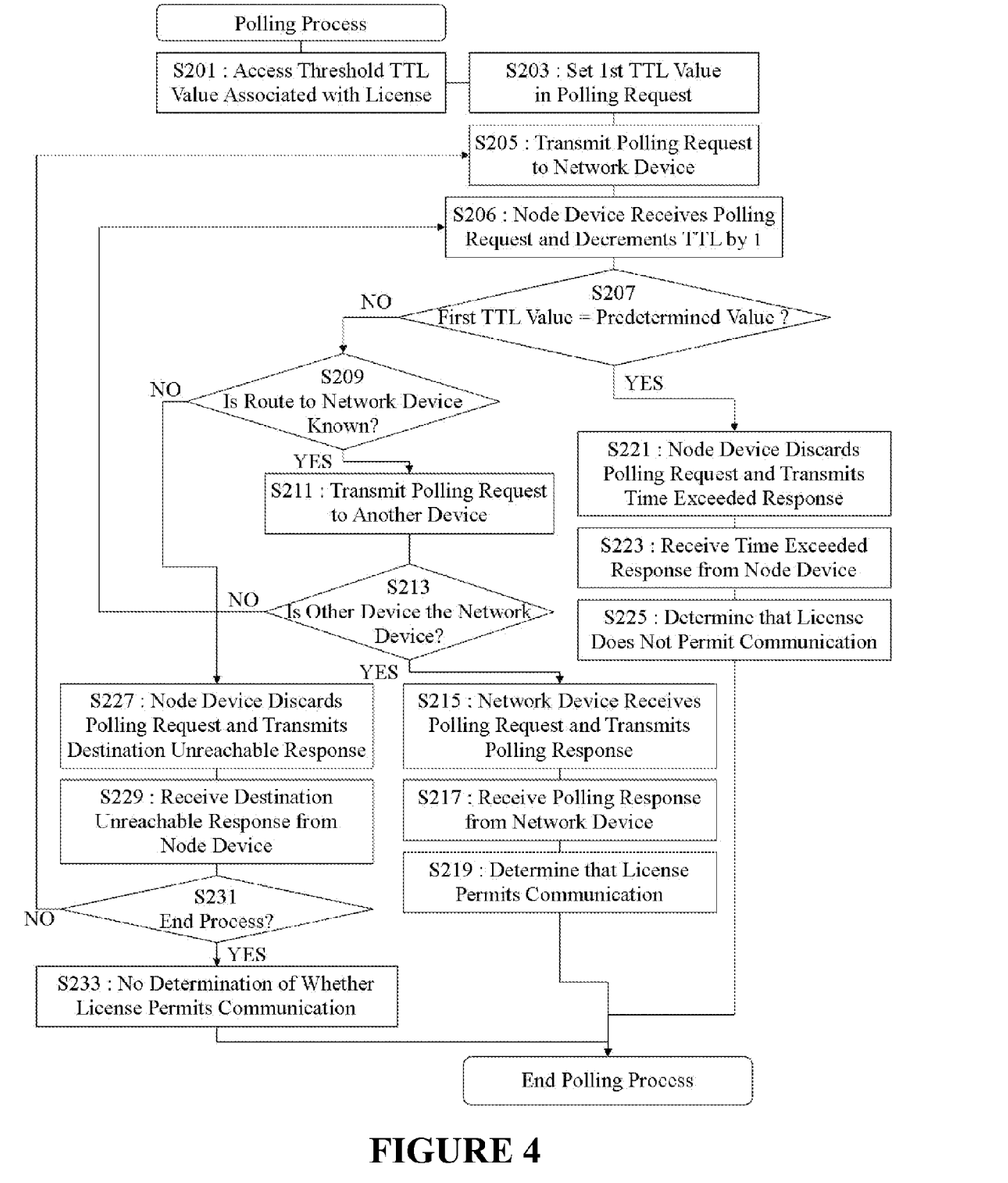
FIG. 4 illustrates a polling process for determining whether a license associated with a monitoring process and a data collection process permits communication between a monitoring device and one or more network device in a current network configuration.

Referring now to FIG. 4, a polling process for determining whether a license associated with one or more of a monitoring process and a data collection process permits communication between monitoring device 106 and one or more network device (e.g., one or more of servers 5, 7, and 9; devices 15, 17, and 19; and node devices 11 and 13) in the current network configuration (e.g., monitoring device 106 is disposed at a particular network location and the network device is disposed at another network location) now is described. In S201, access device 108 may access (e.g., receive) a threshold TTL value associated with the license. In particular, parameters associated with the license, comprising the threshold TTL value, may be stored in one or more of memory 101, a removable memory, and a memory remote from system 3 (e.g., a licensing server). Access device 108 may access the parameters associated with the license, (e.g., by itself or through I/O device 103), read the threshold TTL value, and store the threshold TTL value in memory 101.

In particular, a vendor of, for example, one or more of software, firmware, applications, network devices, and other related technology utilized by system 3 (e.g., technology for performing one or more of the monitoring process or the data collection process) may establish a license to use the vendor's technology or certain functions thereof based on a number of hops (e.g., node device transits) from system 3 or components thereof (e.g., monitoring device 106, polling device 104). The vendor may practically enforce such a range based license restriction by associating the threshold TTL value to the license.

In S203, setting device 110 (e.g., a first setting device) may use a TTL control in an IP header to set (e.g., determine) a first TTL value in a header of a polling request. In particular, setting device 110 may set the first TTL value equal to the threshold TTL value accessed by access device 108 in S201. In S205, transmission device 112 (e.g., first transmission device) may transmit, via I/O device 103, the polling request comprising the first TTL value from polling device 104, which may be disposed at the particular network location (e.g., within zone A, disposed at a monitor point, inside a data center), to one or more network device (e.g., one or more of servers 5, 7, and 9; devices 15, 17, and 19; and node devices 11 and 13), which may be disposed at another network location elsewhere in zone A, within zone B, within zone C, inside the data center, outside the data center). The polling request may comprise a particular data packet and may be, for example, an echo request in internet control message protocol ("ICMP") or a Simple Network Management Protocol ("SNMP") request. As the polling request travels through network 1, the polling request may transit through (e.g., hop through) one or more of node devices 11 and 13. Each time the polling request transits through a node device 11 or 13 (e.g., an IP L3 device), the node device 11 or 13 may decrement (e.g., decrease) the first TTL value by one unit.

In certain configurations, the one or more network device to which transmission device 112 may transmit the polling request may be selected from a range of IP addresses input by a user. In particular configurations, transmission device 112 may attempt to transmit the polling request to all network devices having IP addresses within the range of IP addresses specified by the user. Further, transmission device 112 may transmit the polling request using one or more network protocol that utilizes a TTL value, such as, for example, one or more of Telnet, ICMP, SNMP, Secure Shell ("SSH"), Network Time Protocol ("NTP"), and other protocols that utilize the TTL concept.

In S206, a node device 11 or 13 may receive the polling request from polling device 104. The node device 11 or 13 subsequently may decrement the first TTL value embedded in the polling request by one unit. Thereafter, in S207, the node device 11 or 13 may determine whether the first TTL value equals zero (e.g., a predetermined value). When the node device 11 or 13 decrements the first TTL value to zero (e.g., the predetermined value) (S207: YES), the node device 11 or 13 may discard the corresponding polling request in S221, such that the polling request may not reach the one or more network device to which transmission device 112 transmitted the polling request. In other words, if an attempt is made by an intermediary IP L3 device to forward the polling request to a device where the TTL reaches "0," the device will discard the packet thus preventing communication to the targeted device.

If the first TTL value is not decremented to zero by the node device 11 or 13 prior to arriving at the one or more network device (e.g., the first TTL value has not decreased to a predetermined value before the polling request is received by the network device) (S207: NO), the one or more network device eventually may receive the polling request. Consequently, the one or more network device may transmit a polling response to polling device 104. If the polling request was an echo request, the polling response may be, for example, an echo reply in ICMP and may comprise a copy of the content of the particular data packet comprised in the polling request.

In particular, if the node device 11 or 13 determines that the first TTL value is equal to the predetermined value after decrementing the first TTL value (S207: YES), the node device 11 or 13 may discard the polling request and may transmit a time exceeded response to polling device 104 in S221. In S223, receiving device 114 may receive, via I/O device 103, the time exceeded response from the node device 11 or 13. In response to receiving device 114 receiving the time exceeded response, in S225, determining device 116 may determine, for example, that the one or more network device is not inside the data center, that the one or more network device disposed at the other network location is not within the IP Layer 3 radius with an origin disposed at the particular network location the location of monitoring device 106), and that the license does not permit communication between monitoring device 106 disposed at the particular location and the one or more network device disposed at the other network location (e.g., that the network device is not within a licensing perimeter). Thereafter, the polling process may end.

Accordingly, if the node device 11 or 13 determines that the first TTL value is not equal to the predetermined value after decrementing the first TTL value (S207: NO), the node device 11 or 13 may determine whether a route from the node device 11 or 13 to the network device is available (e.g., known) in S209. If the node device 11 or 13 determines route from the node device 11 or 13 to the network device is not available (S209: NO), the node device 11 or 13 may transmit a destination unreachable response to polling device 104 in S227. In S229, receiving device 114 may receive, via I/O device 103, the destination unreachable response from the node device 11 or 13. In response to receiving device 114 receiving the destination unreachable response, in S231, polling device 104 may determine whether to end the polling process. If polling device 104 determines not to end the polling process (e.g., a default option), the polling process may return to S205. If polling device 104 determines to end the polling process (e.g., a set number of attempts have been made, a command to end is received), the polling process may move to S233, and determining device 116 may not make a determination about whether the license permits communication with the network device disposed at the other network location. In alternative configurations, determining device 116 may determine that the license does not permit communication with the network device disposed at the other network location in S223. Thereafter, the polling process may end.

If the node device 11 or 13 determines route from the node device 11 or 13 to the network device is available (S209: YES), the node device 11 or 13 may transmit the polling request to another device (e.g., one of servers 5, 7, and 9; devices 15, 17, and 19; and node devices 11 and 13). If the other device to which node device 11 or 13 transmits the polling request is not the network device to which the polling request is addressed (e.g., another node device 11 or 13) (S213: NO), the process may return to S206. If the other device to which node device 11 or 13 transmits the polling request is the one or more network device to which the polling request is addressed (S213: YES), the one or more network device may receive the polling request and may transmit a polling response in S215. The network device may validate the credentials included in an SNMP polling request before transmitting an SNMP response. Alternatively, the network device may transmit an echo reply under ICMP when the network device receives an ICMP echo request. The polling response may comprise a new IP data packet with a new TTL value determined by the network device's operating system (e.g., between 64 and 128).

In S217, receiving device 114 (e.g., first receiving device) may receive, via I/O device 103, the polling response from the one or more network device. In response to receiving device 114 receiving the polling response, in S219, determining device 116 may determine, for example, that the network device is inside the data center, that the network device disposed at the other network location is within the IP Layer 3 radius with an origin disposed at the particular network location (e.g., the location of monitoring device 106), and that the license permits communication between monitoring device 106 disposed at the particular location and the network device disposed at the other network location (e.g., that the network device is within the licensing perimeter). Thereafter, the polling process may end. Consequently, the polling process may comprise determining that the license permits communication between the monitoring device and the network device in response to receiving the polling response (e.g., IP packet and associated data whose purpose is to poll the network device) within a permissible threshold TTL value.

Figure 5:
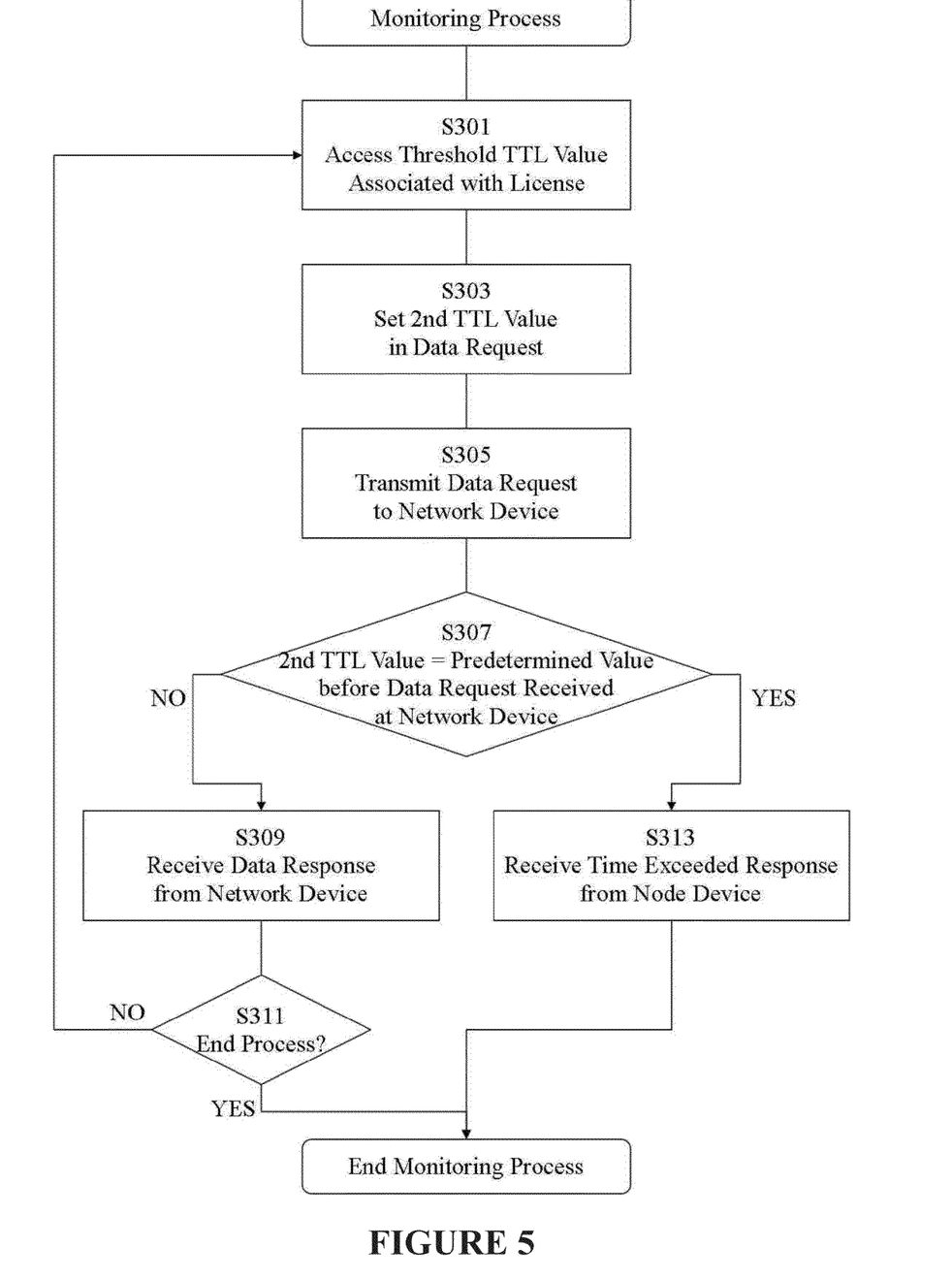
FIG. 5 illustrates a monitoring process for monitoring a metric associated with one or more network device in response to determining that a license associated with the monitoring process permits communication between a monitoring device and the one or more network device in a recent network configuration.

Referring now to FIG. 5, a monitoring process for monitoring a metric associated with one or more network device in response to determining that a license associated with the monitoring process permits communication between monitoring device 106 and the one or more network device (e.g., one or more of servers 5, 7, and 9; devices 15, 17, and 19; and node devices 11 and 13) in a recent network configuration (e.g., monitoring device is disposed at a particular network location and the one or more network device is disposed at the other network location) now is described. In S301, access device 118 may access (e.g., receive) the threshold TTL value associated with the license. Access device 118 may access the parameters associated with the license, by itself or through I/O device 103), read the threshold TTL value, and store the threshold TTL value in memory 101. In particular configurations in which access device 108 stores the threshold TTL value in memory 101 in S201, S301 may be omitted, and the monitoring process may start at S303.

In step S303, setting device 120 (e.g., a second setting device) may use a TTL control in an IP header to set (e.g., determine) a second TTL value in a header of a data request. In particular, setting device 120 may set the second TTL value equal to the threshold TTL value associated with the license. In S305, transmission device 122 (e.g., second transmission device) may transmit, via I/O device 103, the data request comprising the second TTL value from monitoring device 106, which may be disposed at the particular network location (e.g., within zone A, disposed at a monitor point, inside a data center), to one or more network device (e.g., one or more of servers 5, 7, and 9; devices 15, 17, and 19; and node devices 11 and 13), which may be disposed at the other network location. The data request may comprise a particular data packet that comprises a request for information about a metric associated with the one or more network device. As the data request travels through network 1, the data request may transit through (e.g., hop through) one or more of node devices 11 and 13. Each time the data request transits through a node device 11 or 13, the node device 11 or 13 may decrement (e.g., decrease) the second TTL value by one unit.

The one or more network device to which transmission device 122 may transmit the data request may be the one or more network device which transmitted a polling response to polling device 104 during the polling process described with reference to FIG. 4. Further, transmission device 122 may transmit the polling request using one or more network protocol that utilizes a TTL value, such as, for example, one or more of Telnet, ICMP, SNMP, SSH, NTP, and other protocols that utilize the TTL concept.

When a node device 11 or 13 decrements the second TTL value to zero predetermined value), the node device 11 or 13 may discard the corresponding data request, such that the data request may not reach the one or more network device to which transmission device 122 transmitted the data request. Consequently, in S307, each time the data request transits a node device 11 or 13, the node device 11 or 13 may decrement the second TTL value comprised in the header of the data request by one unit, and the node device 11 or 13 may determine whether the second TTL value has reached zero. Consequently, if monitoring device 106 and the one or network device remain in the same relative network locations that monitoring device 106 and the one or network device were in during the polling process (e.g., monitoring device 106 and the one or network device are not moved), the second TTL value comprised in the data request may not be decremented to zero unless the data request traverses a different path along node devices 11 and 13.

If the second TTL value is not decremented to zero by a node device 11 or 13 prior to arriving at the one or more network device (e.g., the second TTL value has not decreased to the predetermined value before the data request is received by the network device) (S307: NO), the one or more network device may receive the data request. Consequently, the one or more network device may transmit a data response to monitoring device 106. The data response may comprise the information about the metric associated with the one or more network device, which was requested in the data request.

Accordingly, if the second TTL value is not decremented to zero by a node device 11 or 13 prior to arriving at the one or more network device (S307: NO), the one or more network device may transmit the data response to monitoring device 106, and the monitoring process may proceed to S309. In S309, receiving device 124 (e.g., second receiving device) may receive, via I/O device 103, the data response from the one or more network device. The data collection process may be performed, and CPU 102 may store the information about the metric associated with the one or more network device in memory 101 or in another memory. The monitoring process may proceed to S311.

In S311, CPU 102 may determine whether the monitoring process is to be terminated. The monitoring process may terminate, for example, in response to the occurrence of a particular event or condition (e.g., in response to disconnection of the one or more network device from network 1, in response to a termination instruction, in response to the passage of a predetermined period of time, after collecting a predetermined quantity of data, in response to not receiving data for a predetermined period of time, in response to an error in system 3, or in response to other events or conditions). In response to CPU 102 determining that the monitoring process is to be terminated (S311: YES), CPU 102 may end the monitoring process. In response to CPU 102 determining that the monitoring process is not to be terminated (e.g., a default setting to not terminate) (S311: NO), the process may return to S301.

If the second TTL value is decremented to zero by a node device 11 or 13 prior to arriving at the network device (e.g., the second TTL value has decreased to the predetermined value before the data request is received by the network device) (S307: YES), the node device 11 or 13 may discard the data request, the one or more network device may not receive the data request, and the one or more network device may not transmit the data response. Nevertheless, the node device 11 or 13 may generate a time exceeded response indicating the data request did not reach the one or more network device to which transmission device 122 transmitted the polling request. Further, the node device 11 or 13 may transmit the time exceeded response to monitoring device 106.

Accordingly, if the second TTL value is decremented to zero by a node device 11 or 13 prior to arriving at the one or more network device (S307: YES), the node device 11 or 13 may transmit the time exceeded response to monitoring device 106, and the monitoring process may proceed to S313. In S313, receiving device 124 may receive, via I/O device 103, the time exceeded response from the node device 11 or 13. In response to receiving device 124 receiving the time exceeded response, determining device 116 may determine, for example, that the one or more network device is no longer inside the data center, that the one or more network device is no longer within the IP Layer 3 radius with an origin disposed at the particular network location (e.g., the location of monitoring device 106), and that the license does not permit communication between monitoring device 106 disposed at the particular location and the one or more network device disposed at the current network location of the one or more network device. Thereafter, monitoring device 106 may stop the monitoring process in response to receiving the time exceeded response from the node device 11 or 13, and the monitoring process may end.

In certain configurations, transmission device 122 may transmit a plurality of data requests from monitoring device 106 to the one or more network devices, and each data request of the plurality of data requests may comprise a second TTL set equal to the threshold TTL value prior to transmitting the each data request. The each data request may comprise a request for information about the metric associated with the one or more network device (e.g., updated information about the metric over time, portions of information about the metric, different parameters associated with the metric). Similar to the above-described configurations, a node device 11 or 13 may decrement the second TTL value comprised in the each data request each time the each data request transits through the node device 11 or 13. Further, receiving device 124 may receive a data response, which may correspond to the each data request, from the one or more network device if a node device 11 or 13 has not decremented the second TTL value comprised in the each data request to the predetermined value before the each data request is received by the network device. The data response may comprise the information about the metric associated with the network device In particular configurations, setting device 120 may set the second TTL value of all data requests (e.g., during each iteration processes S301 through S309) to be transmitted to the one or more network device equal to the threshold TTL value. Thus, if a user moves the one or more network device to still another network location, which is outside the data center or the IP Layer 3 radius originating at the particular network location, after the polling process, the data requests may be discarded before reaching the one or more network device disposed at the still other network location. Consequently, monitoring device 106 may be unable to monitor the one or more network device, and the user may be unable to bypass the license by moving the one or more network device after the polling process.

In some configurations, the particular network location at which monitoring device 106 is disposed may be, for example, a location inside a data center. In such configurations, the threshold TTL value may correspond to an IP Layer 3 radius, which may be defined by, for example, a particular number of node device hops required for a data packet to transit between the particular network location and an outermost network device in the data center (e.g., a particular number of node devices 11 and 13 between monitoring device 106 and an outermost network device in the data center).

Figure 6:
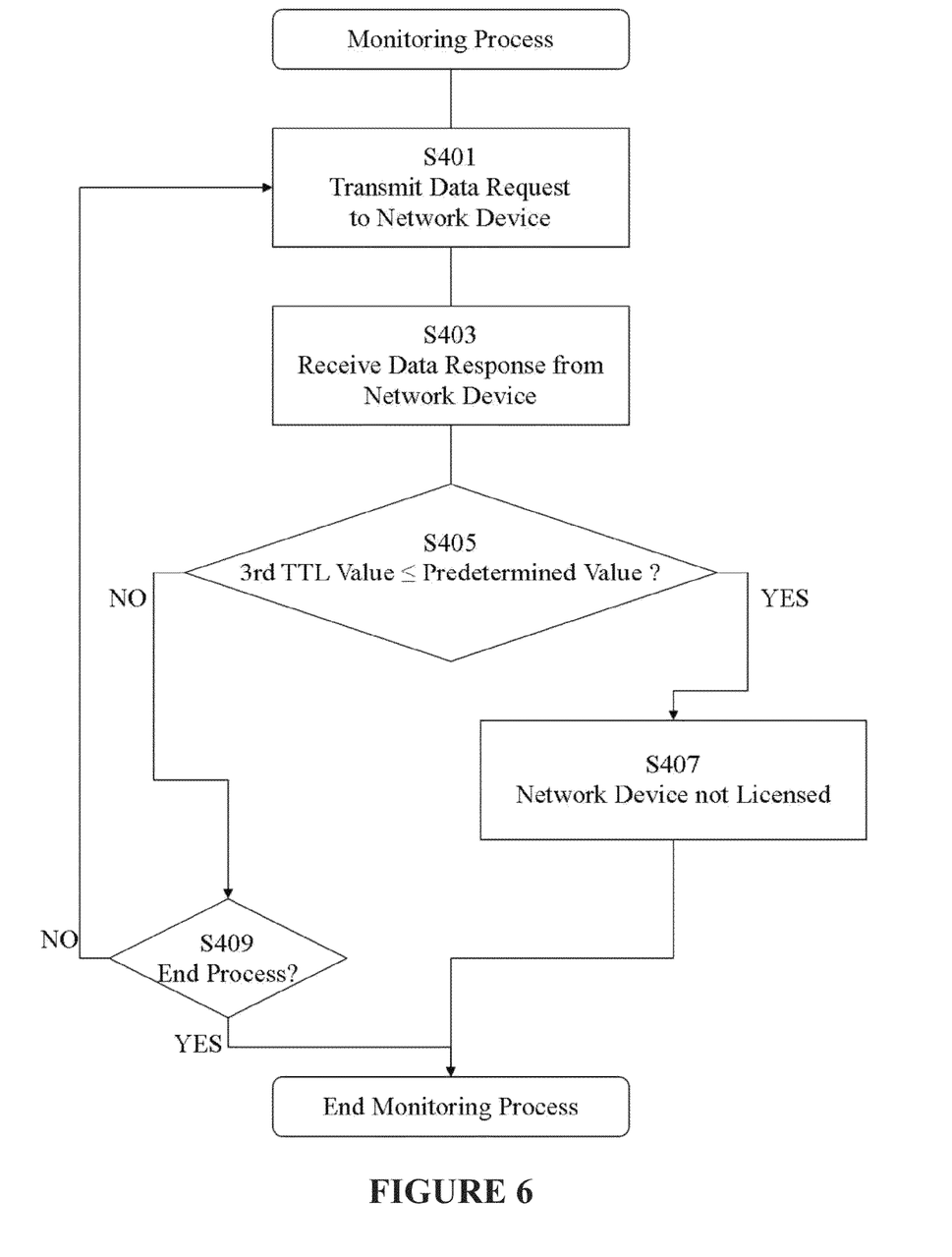
FIG. 6 illustrates a modified monitoring process for monitoring a metric associated with one or more network device in response to determining that a license associated with the monitoring process permits communication between a monitoring device and the one or more network device in a recent network configuration.

Referring now to FIG. 6, a modified monitoring process for monitoring a metric associated with one or more network device in response to determining that a license associated with the monitoring process permits communication between monitoring device 106 and the one or more network device (e.g., one or more of servers 5, 7, and 9; devices 15, 17, and 19; and node devices 11 and 13) in a recent network configuration (e.g., monitoring device is disposed at a particular network location and the one or more network device is disposed at the other network location) now is described. The modified monitoring process is similar to the monitoring process of FIG. 5, except that the processes associated with S301 and S303 may be omitted. For example, when the polling response received at polling device 104 in S217 is an SNMP response, monitoring device 106 may know which operating system the network device uses. Consequently, by knowing the operating system of the network device, monitoring device may also know the initial TTL value included in a response from the network device. Accordingly, setting device 120 may not set the second TTL value to equal the threshold TTL value, but rather may set the second TTL value to the TTL value corresponding to the operating system employed by system 3.

In S401, transmission device 122 (e.g., second transmission device) may transmit, via I/O device 103, the data request comprising the second TTL value from monitoring device 106, which may be disposed at the particular network location (e.g., within zone A, disposed at a monitor point, inside a data center), to one or more network device (e.g., one or more of servers 5, 7, and 9; devices 15, 17, and 19; and node devices 11 and 13), which may be disposed at the other network location. The data request may comprise a particular data packet that comprises a request for information about a metric associated with the one or more network device. As the data request travels through network 1, the data request may transit through (e.g., hop through) one or more of node devices 11 and 13, Each time the data request transits through a node device 11 or 13, the node device 11 or 13 may decrement (e.g., decrease) the second TTL value by one unit. The data request eventually may reach the network device if the TTL value associated with the data request does not reach zero, and the network device may transmit a data response to monitoring device 106 comprising a third TTL value determined by the network device's operating system, which may be known by monitoring device 106. Each time the data response transits through a node device 11 or 13, the node device 11 or 13 may decrement (e.g., decrease) the third TTL value by one unit.

In S403, receiving device 124 (e.g., second receiving device) may receive, via I/O device 103, the data response from the network device. In S405, monitoring device 106 may determine if the third TTL value is equal to a predetermined value. The predetermined value may be determined by subtracting the threshold TTL value from the TTL value used by the operating system employed by the network device (e.g., the predetermined value is 61 if the threshold TTL value is 3 and the operating system employed by the network device uses an initial TTL value of 64). If the third TTL value is less than or equal to the predetermined value when the data response is received at the monitoring device (S405: YES), the monitoring device 106 determines that the network device is not licensed and the monitoring process terminates without collecting data from the network device. If the third TTL value is greater than the predetermined value when the data response is received at the monitoring device (S405: NO), the monitoring device 106 determines that the network device is licensed and the monitoring process may proceed to S409.

In S409, CPU 102 may determine whether the monitoring process is to be terminated. The monitoring process may terminate, for example, in response to the occurrence of a particular event or condition (e.g., in response to disconnection of the one or more network device from network 1, in response to a termination instruction, in response to the passage of a predetermined period of time, after collecting a predetermined quantity of data, in response to not receiving data for a predetermined period of time, in response to an error in system 3, or in response to other events or conditions). In response to CPU 102 determining that the monitoring process is to be terminated (S409: YES), CPU 102 may end the monitoring process. In response to CPU 102 determining that the monitoring process is not to be terminated (e.g., a default setting to not terminate) (S409: NO), the process may return to S401.

The flowcharts and block diagrams in FIGS. 1-6 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

In each of the above-described configurations, the predetermined value may be "0" for IP Layer 3 devices (e.g., node devices, such as routers) in making the decision whether to forward or discard a packet based on TTL value (e.g., in S207 or S307). The IP Layer 3 devices may not have knowledge of the threshold TTL value specified in the license. The IP Layer 3 devices may receive a packet on a network interface, decrement the TTL field in the packet, check to see if the result is "0," and forward the packet (e.g., the packet having a non-zero TTL value) or discard the packet (e.g., the packet having a TTL value equal to "0"). Consequently, when the packet is discarded, an ICMP "Time Exceeded" message may be sent to the sender the originator of the IP packet, such as polling device 104). Polling device 104 may determine implicitly that a targeted network device is within the license agreement by the fact that the targeted network device received the polling request and responded to the polling request (e.g., no intermediary device discarded the polling request along the way). Further, it may not be necessary for polling device 104 or monitoring device 106 to receive a message (e.g., the time exceeded response) to determine that the network device is beyond the license area. The assumption that the network device is beyond the license area may be made if no response is made or received based on one or more of the polling request and the data request.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed.

Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
receiving a threshold time to live ("TTL") value associated with a license;
determining a first TTL value based on the threshold TTL value;
transmitting a polling request comprising the first TTL value from a polling device disposed at a particular network location to a network device, the first TTL value decreasing each time the polling request transits through a node device;
receiving a polling response from the network device if the first TTL value has not decreased to a first predetermined value before the polling request is received by the network device;
determining that the license permits communication between a monitoring device disposed at the particular network location and the network device in response to receiving the polling response;
transmitting a plurality of data requests from the monitoring device to the network device, each data request of the plurality of data requests comprising a second TTL value set based on the threshold TTL value prior to transmitting the each data request, the each data request further comprising a request for information about a metric associated with the network device, and the second TTL value decreasing each time the each data request transits through the node device;
receiving a data response corresponding to the each data request if the second TTL value comprised in the each data request has not decreased to the first predetermined value before the each data request is received by the network device, the data response comprising the information about the metric associated with the network device; and
storing data corresponding to the information about the metric associated with the network device in a memory.

2. The method of claim 1, further comprising:
receiving a destination time exceeded response from the node device if the first TTL value decreases to the first predetermined value in response to the polling request transiting through the node device; and
determining that the license does not permit communication between the monitoring device and the network device in response to receiving the time exceeded response.

3. The method of claim 1, further comprising:
receiving a data response comprising a third TTL value and the information about the metric associated with the network device if the third TTL value has not decreased to a value less than or equal to a second predetermined value, the third TTL value decreasing each time the data response transits through the node device, and the second predetermined value based on the threshold TTL value and a TTL value associated with an operating system of the network device.

4. The method of claim 3, further comprising:
receiving a first time exceeded response from the node device in response to the first TTL value decreasing to the first predetermined value in response to the polling request transiting through the node device;
determining that the license does not permit communication between the monitoring device and the network device in response to receiving the first time exceeded response,
receiving a second time exceeded response from the node device in response to the second TTL value decreasing to the first predetermined value in response to the data request transiting through the node device; and
stopping monitoring the metric associated with the network device in response to receiving the second time exceeded response.

5. The method of claim 1,
wherein the particular network location is a location within a data center, and
wherein the threshold TTL value corresponds to an internet protocol ("IP") layer 3 radius defined by a particular number of node device hops required for a data packet to transit between the particular network location and an outermost network device in the data center.

6. The method of claim 1,
wherein the polling request comprises an echo request, and
wherein the polling response comprises an echo reply.

7. A system comprising:
an access device configured to receive a threshold time to live ("TTL") value associated with a license;
a first setting device configured to determine a first TTL value based on the threshold TTL value;
a first transmission device disposed at a particular network location and configured to transmit a polling request comprising the first TTL value from a polling device disposed at the particular network location to a network device, the first TTL value decreasing each time the polling request transits through a node device;
a first receiving device configured to receive a polling response from the network device if the first TTL value has not decreased to a first predetermined value before the polling request is received by the network device;
a determining device configured to determine that the license permits communication between a monitoring device disposed at the particular network location and the network device in response to receiving the polling responses;
a second transmission device configured to transmit a plurality of data requests from the monitoring device to the network device, each data request of the plurality of data requests comprising a second TTL value set based on the threshold TTL value prior to transmitting the each data request, the each data request further comprising a request for information about a metric associated with the network device, and the second TTL value decreasing each time the each data request transits through the node device;
a second receiving device configured to receive a data response corresponding to the each data request if the second TTL value comprised in the each data request has not decreased to the first predetermined value before the each data request is received by the network device, the data response comprising the information about the metric associated with the network device; and
a memory configured to store data corresponding to the information about the metric associated with the network device.

8. The system according to claim 7,
wherein the first receiving device is configured to receive a time exceeded response from the node device if the first TTL value decreases to the first predetermined value in response to the polling request transiting through the node device, and
wherein the determining device is configured to determine that the license does not permit communication between the monitoring device and the network device in response to receiving the time exceeded response.

9. The system according to claim 7,
wherein the second receiving device is further configured to receive a data response comprising a third TTL value and the information about the metric associated with the network device if the third TTL value has not decreased to a value less than or equal to a second predetermined value, the third TTL value decreasing each time the data response transits through the node device, and the second predetermined value based on the threshold TTL value and a TTL value associated with an operating system of the network device.

10. The system according to claim 9,
wherein the first receiving device is configured to receive a first time exceeded response from the node device if the first TTL value decreases to the first predetermined value in response to the polling request transiting through the node device,
wherein the determining device is configured to determine that the license does not permit communication between the monitoring device and the network device in response to receiving the first time exceeded response,
wherein the second receiving device is configured to receive a second time exceeded response from the node device if the second TTL value decreases to the first predetermined value in response to the data request transiting through the node device, and
wherein the monitoring device is configured to stop monitoring the metric associated with the network device in response to receiving the second time exceeded response.

11. The system according to claim 7,
wherein the particular network location is a location within a data center, and
wherein the threshold TTL value corresponds to an internet protocol ("IP") layer 3 radius defined by a particular number of node device hops required for a data packet to transit between the particular network location and an outermost network device in the data center.

12. The system of claim 7,
wherein the polling request comprises an echo request, and
wherein the polling response comprises an echo reply.

13. A computer program product comprising:
a computer readable memory having computer readable program code embodied therewith, the computer readable program code comprising:
    computer readable program code configured to receive a threshold time to live ("TTL") value associated with a license;
    computer readable program code configured to determine a first TTL value based on the threshold TTL value;
    computer readable program code configured to transmit a polling request from a polling device disposed at a particular network location to a network device, the first TTL value decreasing each time the polling request transits through a node device;
    computer readable program code configured to receive a polling response from the network device if the first TTL value has not decreased to a first predetermined value before the polling request is received by the network device;
    computer readable program code configured to determine that the license permits communication between a monitoring device disposed at the particular network location and the network device in response to receiving the polling response;
    computer readable program code configured to transmit a plurality of data requests from the monitoring device to the network device, each data request of the plurality of data requests comprising a second TTL value set based on the threshold TTL value prior to transmitting the each data request, the each data request further comprising a request for information about a metric associated with the network device, and the second TTL value decreasing each time the each data request transits through the node device; and
    computer readable program code configured to receive a data response corresponding to the each data request if the second TTL value comprised in the each data request has not decreased to the first predetermined value before the each data request is received by the network device, the data response comprising the information about the metric associated with the network device; and
    computer readable program code configured to store data corresponding to the information about the metric associated with the network device in a memory.

14. The computer program product according to claim 13, wherein the computer readable program code embodied therewith the computer readable memory further comprises:
    computer readable program code configured to receive a time exceeded response from the node device if the first TTL value decreases to the first predetermined value in response to the polling request transiting through the node device; and
    computer readable program code configured to determine that the license does not permit communication between the monitoring device and the network device in response to receiving the time exceeded response.

15. The computer program product according to claim 13, wherein the computer readable program code embodied therewith the computer readable memory further comprises:
    computer readable program code configured to receive a data response comprising a third TTL value and the information about the metric associated with the network device if the third TTL value has not decreased to a value less than or equal to a second predetermined value, the third TTL value decreasing each time the data response transits through the node device, and the second predetermined value based on the threshold TTL value and a TTL value associated with an operating system of the network device.

16. The computer program product according to claim 15, wherein the computer readable program code embodied therewith the computer readable memory further comprises:
    computer readable program code configured to receive a first time exceeded response from the node device if the first TTL value decreases to the first predetermined value in response to the polling request transiting through the node device;

computer readable program code configured to determine that the license does not permit communication between the monitoring device and the network device in response to receiving the first time exceeded response;

computer readable program code configured to receive a second time exceeded response from the node device if the second TTL value decreases to the first predetermined value in response to the data request transiting through the node device; and computer readable program code configured to stop monitoring the metric associated with the network device in response to receiving the second time exceeded response.

17. The computer program product according to claim 13, wherein the particular network location is a location within a data center, and
wherein the threshold TTL value corresponds to an internet protocol ("IP") layer 3 radius defined by a particular number of node device hops required for a data packet to transit between the particular network location and an outermost network device in the data center.

18. The computer program product according to claim 13, wherein the polling request comprises an echo request, and wherein the polling response comprises an echo reply.

* * * * *